United States Patent
Wallace et al.

(10) Patent No.: US 7,260,782 B2
(45) Date of Patent: Aug. 21, 2007

(54) METHOD AND SYSTEM FOR GENERATING FLEXIBLE TIME-BASED CONTROL OF APPLICATION APPEARANCE AND BEHAVIOR

(75) Inventors: Michael W. Wallace, Vancouver, WA (US); Larry Alan Westerman, Portland, OR (US)

(73) Assignee: Ensequence, Inc., Portland, OR (US)

( * ) Notice: Subject to any disclaimer, the term of this patent is extended or adjusted under 35 U.S.C. 154(b) by 888 days.

(21) Appl. No.: 10/427,357

(22) Filed: Apr. 30, 2003

(65) Prior Publication Data
US 2004/0010771 A1    Jan. 15, 2004

Related U.S. Application Data

(60) Provisional application No. 60/395,655, filed on Jul. 12, 2002.

(51) Int. Cl.
*G11B 27/00* (2006.01)
(52) U.S. Cl. ...................................... 715/716
(58) Field of Classification Search ................. 715/716
See application file for complete search history.

(56) References Cited

U.S. PATENT DOCUMENTS

2004/0221237 A1* 11/2004 Foote et al. ................. 715/700
2007/0005795 A1*  1/2007 Gonzalez .................... 709/232

* cited by examiner

*Primary Examiner*—Kristine Kincaid
*Assistant Examiner*—Le Nguyen
(74) *Attorney, Agent, or Firm*—Black Lowe & Graham, PC

(57) ABSTRACT

A method, a computer readable medium, and a system are provided for generating control information for controlling computer system operation during execution of the computer system. At least one attribute change of a computer system to occur during execution of the computer system is identified. The attribute change is associated with an event taking place during computer system execution. An index point is created identifying the attribute point as triggering the attribute change, and the index point is associated with the attribute change in the computer system. The index point is stored in a format configured to be used by the computer system to initiate the attribute change upon the index point being reached during the execution of the computer system.

36 Claims, 7 Drawing Sheets

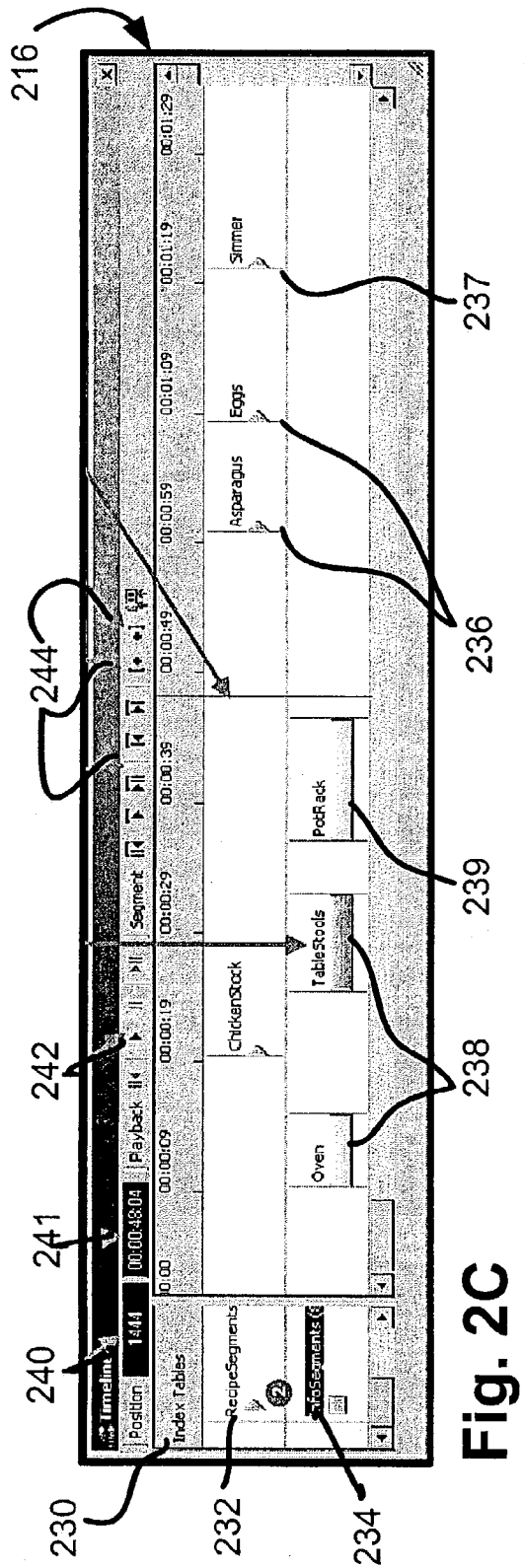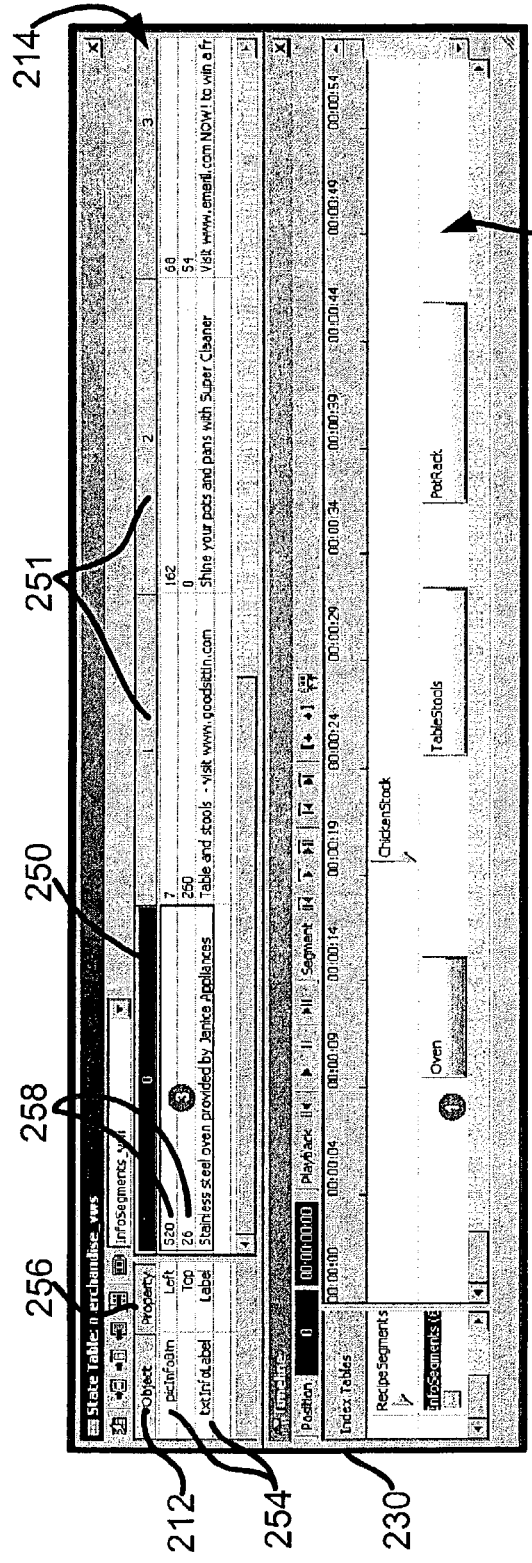
Fig. 2C
Fig. 2D

METHOD AND SYSTEM FOR GENERATING FLEXIBLE TIME-BASED CONTROL OF APPLICATION APPEARANCE AND BEHAVIOR

PRIORITY CLAIM

This invention claims priority from U.S. Provisional Application No. 60/395,655, entitled "METHOD AND SYSTEM FOR FLEXIBLE TIME-BASED CONTROL OF APPEARANCE AND BEHAVIOR OF SOFTWARE APPLICATION," filed Jul. 12, 2002.

RELATED APPLICATIONS

This patent application is related to concurrently-filed patent applications entitled "METHOD AND SYSTEM FOR AUTOMATIC CONTROL OF GRAPHICAL COMPUTER APPLICATION APPEARANCE AND EXECUTION," bearing Ser. No. 10/427,735, "METHOD AND SYSTEM FOR FLEXIBLE TIME-BASED CONTROL OF APPEARANCE AND BEHAVIOR OF SOFTWARE APPLICATION," bearing Ser. No. 10/427,343, and "METHOD AND SYSTEM FOR PROVIDING FLEXIBLE TIME-BASED CONTROL OF APPLICATION APPEARANCE AND BEHAVIOR," bearing Ser. No. 10/427,255, all of which are incorporated by reference.

FIELD OF THE INVENTION

This invention relates generally to computer software applications and, more specifically, to timing, control, and development of software applications.

BACKGROUND OF THE INVENTION

The improved price-performance of digital technology has made possible the advent of digital media broadcasting. The reduced cost of microprocessors, digital memory, and related devices has made it possible to place computers in set-top boxes (STBs) and related devices to receive digital cable or digital satellite television signals and decode those signals into audio-visual programs.

The advent of digital television broadcasting and the proliferation of STBs also makes it possible to enhance viewers' television experiences. In addition to transmitting video and audio data, digital media broadcasting allows additional data to be transmitted to the STBs with which users can interact. By analogy, users can interact through an STB with data transmitted via the digital media broadcast the way a computer user can interact with data available over the Internet. For example, digital television subscribers are already acquainted with an electronic program guide (EPG) function which enables users to select and tune to particular programs and/or read about the programs being shown at present or at later points in time.

The EPG is a rudimentary example of an interactive television application exploiting the capability of the digital broadcast medium to transmit additional content and for the STB to execute this additional content. The computer functionality of STBs also makes other interactive television applications possible. With appropriately configured STBs, users potentially can play along with game shows, take tests in on-line distance learning courses, bid in on-line auctions, and otherwise actively engage the content being broadcast. STBs thus allow users to have highly interactive television experiences.

One type of additional content application which is desirable in such a broadcast environment is one which provides functionality synchronized with video or audio content on a broadcast channel. In the examples of interactive game shows, on-line distance learning testing, and on-line auctions, it would be highly desirable to provide application-specific behaviors in an STB which are correlated to associated video and audio streams being broadcast. Providing application-specific behaviors in the STB and correlating the application-specific behaviors with video and audio streams presents a number of concerns. These concerns and conventional responses to these concerns are described in detail in the co-pending patent applications incorporated by reference. Nonetheless, at least some of these concerns merit repeating.

First, synchronizing behaviors of the application specific programming with a series of events in the video and audio data can be difficult. Applications of this type conventionally use asynchronous trigger signals embedded in the broadcast signal. These asynchronous trigger signals can be difficult to deliver accurately when data blocks carrying such triggers must be multiplexed with so much other video and audio data transmitted in the medium. Further, these time-dependencies present particular concerns when a user engages a program already in progress and may have missed a timing synchronization event at the outset of the program. Correlating the application-specific programming with the video and audio stream may be troublesome, if even possible.

Second, providing application specific behaviors to STBs conventionally involves transmitting application-specific program code to the STBs. The transmission would be carried through the digital broadcast medium, just as video and audio data are transmitted. Downloading such applications involves transmitting potentially many data packets, comprising vast numbers of data blocks, for each application. A concern arises because video and audio data for the numerous channels being transmitted leaves little bandwidth for other data. Thus, it may be difficult to procure the bandwidth necessary to transmit large bodies of application specific programming to support desired behaviors in STBs. Moreover, STBs may have relatively little random access memory (RAM) in which to store significant applications.

Third, and potentially more troubling, is that creating interactive programming conventionally involves programmers having to write application code specific to each program. Writing, testing, and debugging application code for each episode of a program is time- and labor-intensive. It may be difficult to generate application code correlated to underlying video and audio content in time to meet programming schedules. Also, having skilled programmers and software engineers capable of writing the application code is likely to be expensive. Each of these concerns is magnified in light of the concerns with timing synchronization and the need to generate short, efficient code to minimize bandwidth demands as previously described.

Thus, there are unmet needs in the art for methods and systems for efficiently developing interactive content and for generating appropriately synchronized applications which can be communicated to STBs and other user facilities without overwhelming available bandwidth capacities.

SUMMARY OF THE INVENTION

Embodiments of the present invention provide for developing control information for controlling appearance and behavior during execution of a computer system. A user monitoring a video and/or audio program can identify attributes to be added, changed, and deleted during execution of the program, and can establish timing for the presentation or removal of these attributes. The control information is collected into a format which can be used by a computer system to execute the attributes generated and sequenced by embodiments of the present invention together with the composite video and audio program. Taking advantage of a simplified environment provided for generating the control information, such as a graphical user interface-driven environment, embodiments of the present invention allow control information governing behavior of a computer system during computer system execution to be generated without writing computer program code. Accordingly, control information for controlling computer system execution can be created by designers as well as or instead of computer programmers. In addition, embodiments of the present invention allow for creation and changing of attributes which can be disseminated in real-time using broadcast facilities or another network.

More specifically, embodiments of the present invention provide a method, a computer readable medium, and a data system for generating control information for controlling computer system operation during execution of the computer system. Using embodiments of the present invention at least one attribute change of a computer system to occur during execution of the computer system is identified. The attribute change is associated with an event taking place during computer system execution. An index point is created identifying the attribute point as triggering the attribute change, and the index point is associated with the attribute change in the computer system. The index point is stored in a format configured to be used by the computer system to initiate the attribute change upon the index point being reached during the execution of the computer system.

Embodiments of the present invention suitably collect index points associated with the attribute change in an index table. The index table can have a number of columns listing events triggering attribute changes and other characteristics that determine, for example, whether the attribute change associated with the index point will be initiated if the execution of the computer system commenced after an event associated with the index point has been reached. If desired, attribute changes can be collected in a state table in which attribute changes occurring at a common point are grouped into a common state change. The state table can be configured such that as each state change is reached, the attributes collected in that state change are automatically triggered. The attribute change and index point information can be separately stored, revised, and loaded. The attribute change and index point information also can be correlated with an underlying program such that attribute changes are correlated with the underlying program.

In accordance with further aspects of the invention, an authoring environment is provided allowing a program author to observe the underlying program while either creating the attribute change or associating the attribute change with the event taking place during the execution of the computer program. The authoring environment allows the author to review and modify attribute changes as well as association of the attribute change with index points associating the attribute change with events transpiring during program execution. Thus, the authoring environment can allow simulation of a computer environment in which the program will be executed to review operation of the attribute changes.

BRIEF DESCRIPTION OF THE DRAWINGS

The preferred and alternative embodiments of the present invention are described in detail below with reference to the following drawings.

FIG. 2C is a set of windows of the development environment shown in FIG. 2A for developing index points for controlling attribute changes;

FIG. 2D is a set of windows of the development environment shown in FIG. 2A for developing an attribute change table interacting with the set of index points;

DETAILED DESCRIPTION OF THE INVENTION

By way of overview, embodiments of the present invention provide a method, a computer readable medium, and a data system for generating control information for controlling computer system operation during execution of the computer system. Using embodiments of the present invention at least one attribute change of a computer system to occur during execution of the computer system is identified. The attribute change is associated with an event taking place during computer system execution. An index point is created identifying the attribute point as triggering the attribute change, and the index point is associated with the attribute change in the computer system. The index point is stored in a format configured to be used by the computer system to initiate the attribute change upon the index point being reached during the execution of the computer system.

Figure 1:
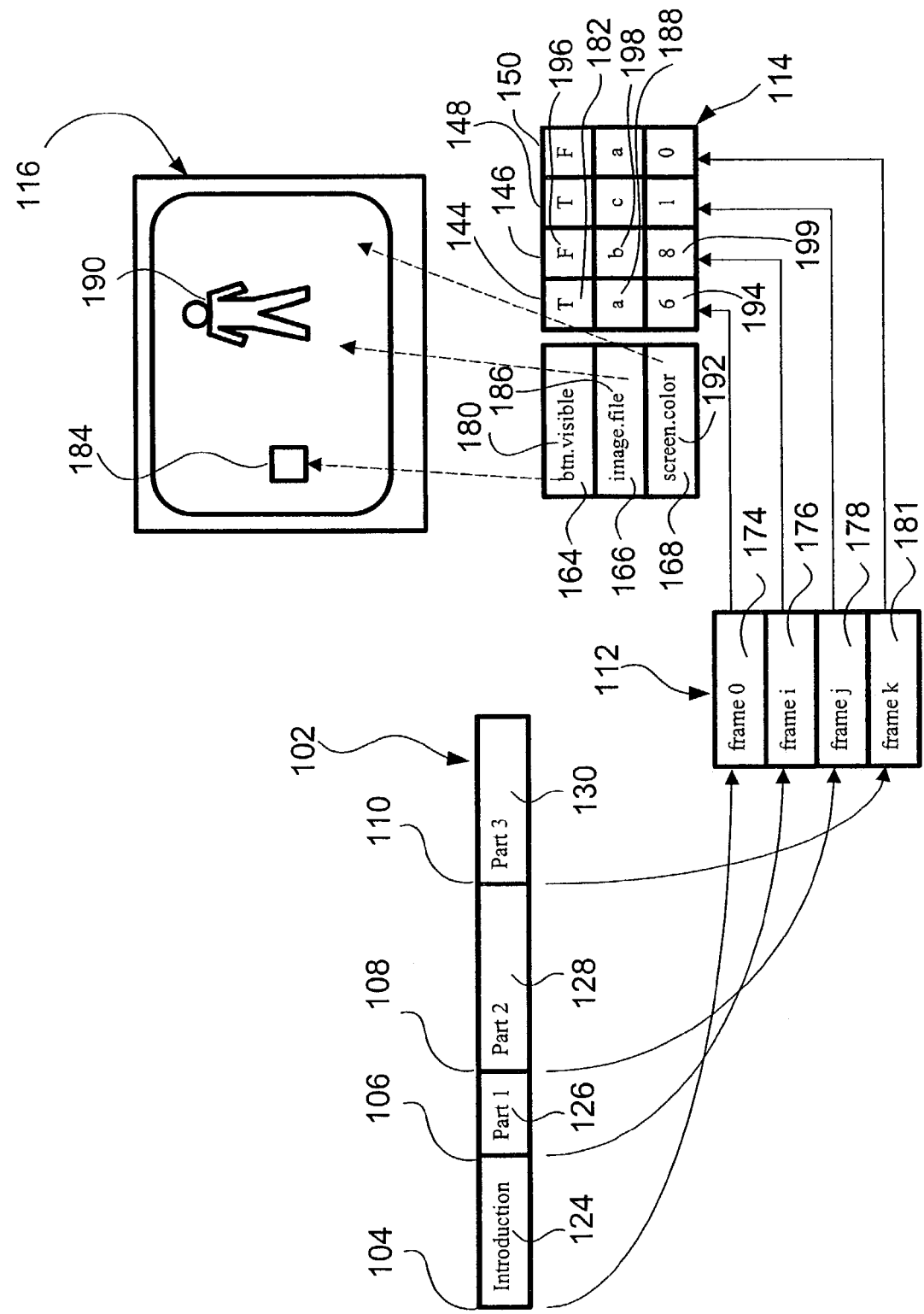
FIG. 1 shows a timeline of event triggers driving an index table and a state table for controlling an interactive software application according to an embodiment of the present invention.

FIG. 1 shows exemplary interaction between a video timeline 102 for a program with identified events 104, 106, 108, and 110, an index table 112, a plurality of attribute changes collected as state changes in a state table 114, and a program display 116 that can be generated by one embodiment of the invention that by way of a non-limiting example. The operation of the state changes stored in the state table 114, the operation of the index points contained in the index table 112, and a facility for executing information contained in such tables are further described in the concurrently-filed, co-pending patent applications entitled "METHOD AND SYSTEM FOR AUTOMATIC CONTROL OF GRAPHICAL COMPUTER APPLICATION APPEARANCE AND EXECUTION," bearing Ser. No. 10/427,735, "METHOD AND SYSTEM FOR FLEXIBLE TIME-BASED CONTROL OF APPEARANCE AND BEHAVIOR OF SOFTWARE APPLICATION," bearing Ser. No. 10/427,343, and "METHOD AND SYSTEM FOR PROVIDING FLEXIBLE TIME-BASED CONTROL OF APPLICATION APPEARANCE AND BEHAVIOR," bearing Ser. No. 10/427,255, respectively, the contents of which are hereby incorporated by reference. Information such as that manifested in the tables 112 and 114 for controlling execution of the computer suitably are generated by embodiments of the present invention.

The video timeline 102 depicts four sequences in the program, including an introduction 124, Part 1 126, Part 2 128, and Part 3 130. The beginnings of these sequences 124, 126, 128, and 130 are identified as events 104, 106, 108, and 110, respectively, to be used in correlating presentation of additional content. The events 104, 106, 108, and 110 are thus associated with index points 174, 176, 178, and 181 and collected in the index table 112 in sequential order. In turn, each of the index points 174, 176; 178, and 181 are associated with a state 144, 146, 148, and 150, respectively, in the state table 114. The state table 114 also lists three program attributes 164, 166, and 168 which control appearance and behavior of the program as shown on the program display 116. As a result, as the video timeline 102 progresses with presentation of the program, each of the events 104, 106, 108, and 110 are reached. Reaching each of these events 104, 106, 108, and 110 triggers index points 174, 176, 178, and 181, respectively, in the index table 112. Reaching index points 174, 176, 178, and 181 in the index table 112 triggers state changes to states 144, 146, 148, and 150, respectively, thereby potentially changing each of the program attributes appearing on the program display 116.

More specifically, as represented on the video timeline 102, the program commences at a beginning associated with event 104. The event 104, which occurs at "frame 0" at the beginning of the program, is associated with index point 174 and state 144, which is a first state in the state table 114. At the state 144, a program attribute "btn.visible" 180 is set to "T" 182 for true, thereby making a button 184 appear on the program display 116. A program attribute "image.file" 186 is set to "a" 188, thereby making an associated image 190 appear on the program display. A program attribute "screen.color" 192 is set to "6" 194, changing a color of a background on the program display 116.

The program continues to progress according to the video timeline 102 and reaches the event 106 which occurs at "frame i" at the beginning of a next segment of the program. The event 106 occurs at "frame i" and is associated with index point 176 and state 146. Thus, upon reaching event 106, index point 176 automatically triggers the state change to state 146. At the state 146, the program attribute "btn.visible" 180 is set to "F" 196 for false, thereby making the button 184 disappear from the program display 116. The program attribute "image.file" 186 is set to "b" 198, making an associated image (not shown) appear on the program display in the place of image 190. The program attribute "screen.color" 192 is set to "8" 199, again changing a color of a background on the program display. Similarly, as the events 108 at "frame j" and 110 at "frame k" are reached, index points 178 and 181, respectively, trigger state changes in the state table 114 to the states 148 and 150, respectively, thereby changing the appearance and behavior of the program as evidenced by the appearance of the display screen 116. In sum, when events logged as index points are reached during execution of the program, states changes associated with the index points are triggered, thereby initiating associated attribute changes.

It will be appreciated that execution of an application as described by the non-limiting example advantageously can be performed upon actual execution of the application at a viewer/user location or in emulating the execution of the application prior to dissemination of the application. In the former case, the application might be executed by a STB which first loads the state change and index point information, then executes the state changes according to the index points. In the latter case, the application might be executed on a computer emulating the STB environment by loading the state change and index point information and allowing program developers or editors to monitor how the application will execute in a viewer/user environment. Facilities for executing the application in a viewer/user environment is further described in the concurrently filed and co-pending patent application entitled "METHOD AND SYSTEM FOR PROVIDING FLEXIBLE TIME-BASED CONTROL OF APPLICATION APPEARANCE AND BEHAVIOR," bearing Ser. No. 10/427,255, the contents of which are incorporated by reference. FIGS. 2A-2E present screens from an environment in which such an application, controlled by tables 112 and 114 can be created, revised, and/or reviewed. FIG. 3 shows a routine for how such tables 112 and 114 can be generated in such an environment or other environments.

Figure 2A:
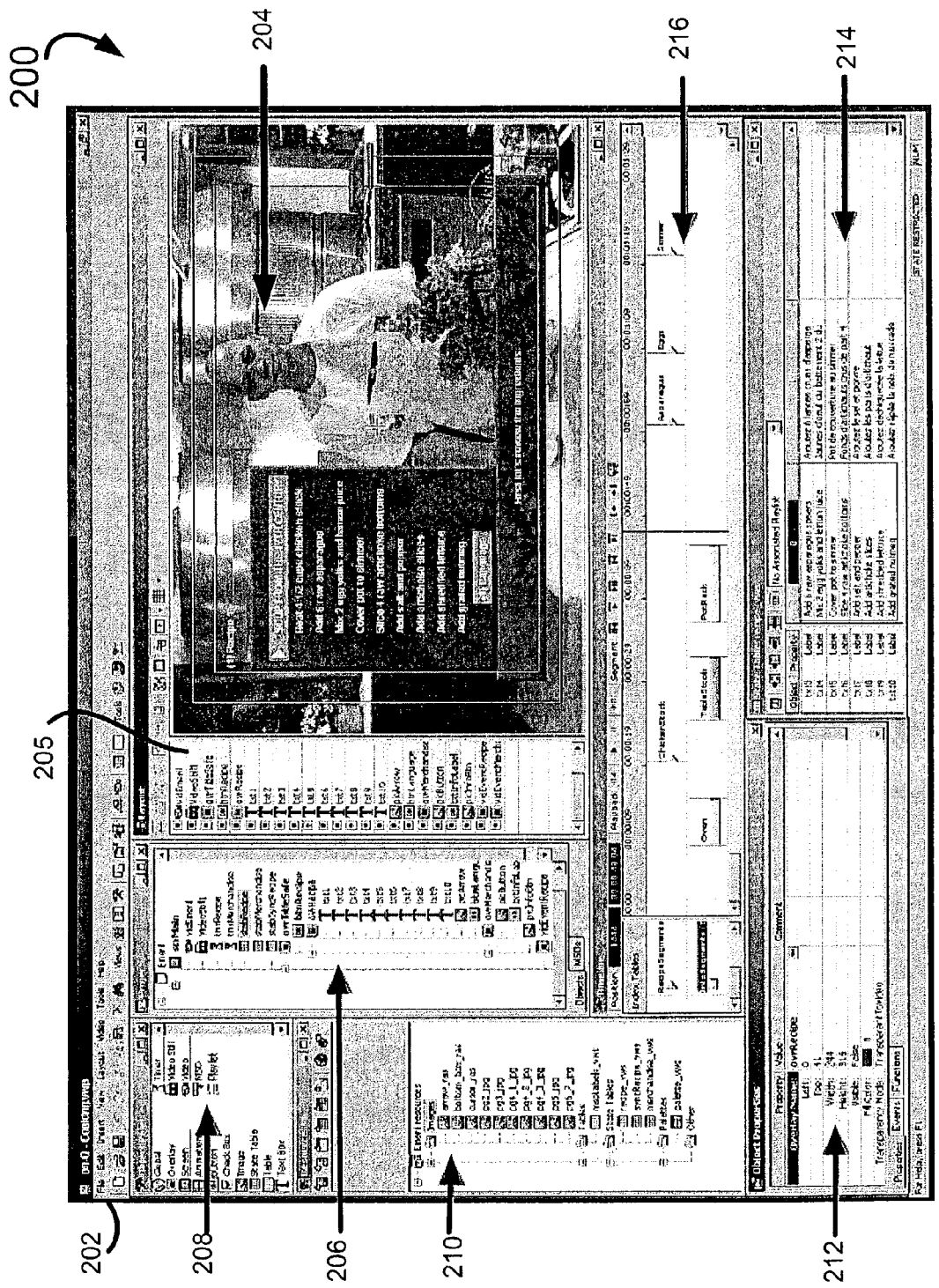
FIG. 2A is a screen shot from a development environment for developing interactive programming in accordance with an embodiment of the present invention.

FIG. 2A shows a screen shot from a development environment 200 for developing interactive programming in accordance with an embodiment of the present invention. A number of separate windows present different forms of information a program developer or author can use to create the control information for facilitating execution of the program. FIG. 2A, as well as FIGS. 2B-2E, shows a graphical user interface environment which facilitates point-and-click/drag-and-drop commands with which users of conventional personal computers and other microcomputers are well familiar. Taking advantage of a simplified environment provided, such as a graphical user interface-driven environment, embodiments of the present invention allow control information governing behavior of a computer system during computer system execution to be generated without writing computer program code. Accordingly, control information for controlling computer system execution can be created by designers as well as or instead of computer programmers. A graphical user interface-driven system represents one presently preferred embodiment of the present invention because it allows a program developer to simultaneously engage an underlying video and audio program with which the developer might be working and provides synergy in operation with an underlying visual medium. However, it will be appreciated that the controlling information also suitably are generated through text- and command-driven procedures, as also can be used in the embodiment shown in FIGS. 2A-2E. Thus, embodiments of the present invention are not limited to a graphical user interface environment.

As previously mentioned, one presently preferred embodiment of the development environment 200 includes a number of windows. The development environment 200 suitably provides a familiar arrangement of icon and menus 202. A program monitoring window 204 is operable both to display an underlying video program and display attributes being added or changed as will be further explained in connection with FIG. 2B. Although not shown, it will be appreciated that a suitable audio device (not shown) also can be provided to allow for monitoring of associated audio content from the underlying program or that the developer suitably creates, revises, and/or associates with the underlying program. A layout window 205 lists objects currently being viewed by the user. A project window 206 allows the developer to view and manipulate the object hierarchy of the current project. An object window 208 gives the developer access to a library of objects or templates he or she can use in adding objects to the project hierarchy. Such objects and templates can be preprogrammed by a developer of the development environment, or might be objects or templates previously created by the program developer for his or her own later use, much as word processing and spreadsheet users can use preprogrammed macros or create their own macros to facilitate desired operations.

A resource window 210 gives the developer access to data files he or she has previously created, other multimedia elements he or she may want to include, or other resources he or she might want to import into the current project. An object property window 212, as will be further described in connection with FIGS. 2B and 2D, manifests properties assigned to on-screen or other objects. As previously described, the developer can engage the graphical user interface system using graphical and kinesthetic interaction or can use a command- and text-driven approach. The object property window 212 manifests attribute features in a textual form for text- and command-driven review and manipulation. A state table window 214 allows the developer to control attribute changes. Attribute changes having common features can be grouped into states for linking their presentation together and/or to common event triggers as previously described in connection with the non-limiting example shown in FIG. 1 and in the concurrently filed co-pending applications incorporated by reference. Similarly, an index point window 216 allows the developer to associate attribute changes and state changes with events transpiring during execution of the program. The developer also can use the index point window 216 to assign various timing-based properties with the attributes as described in the concurrently filed co-pending applications incorporated herein by reference.

Figure 2B:
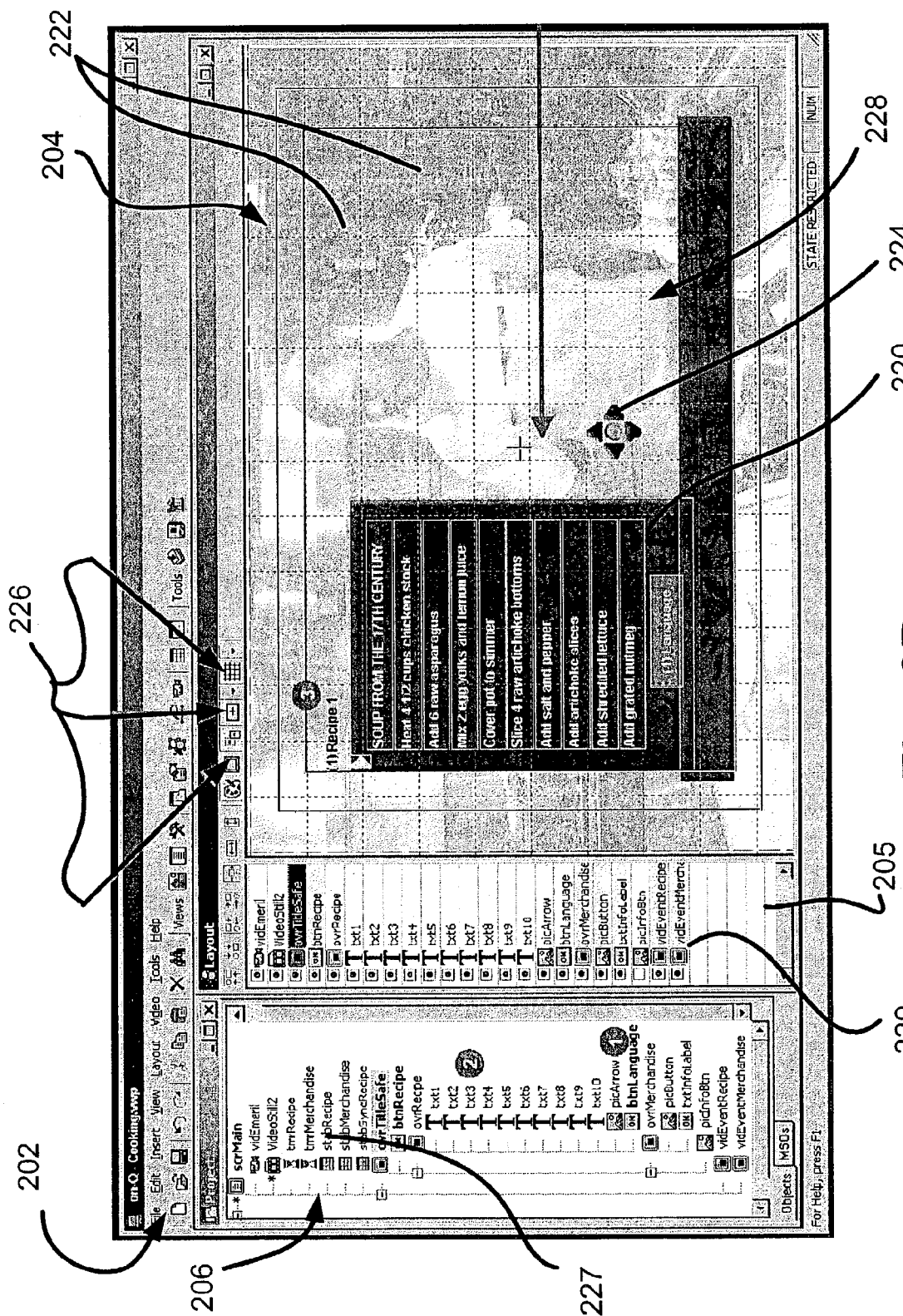
FIG. 2B is a set of windows of the development environment shown in FIG. 2A for developing attribute changes.
Figure 3:
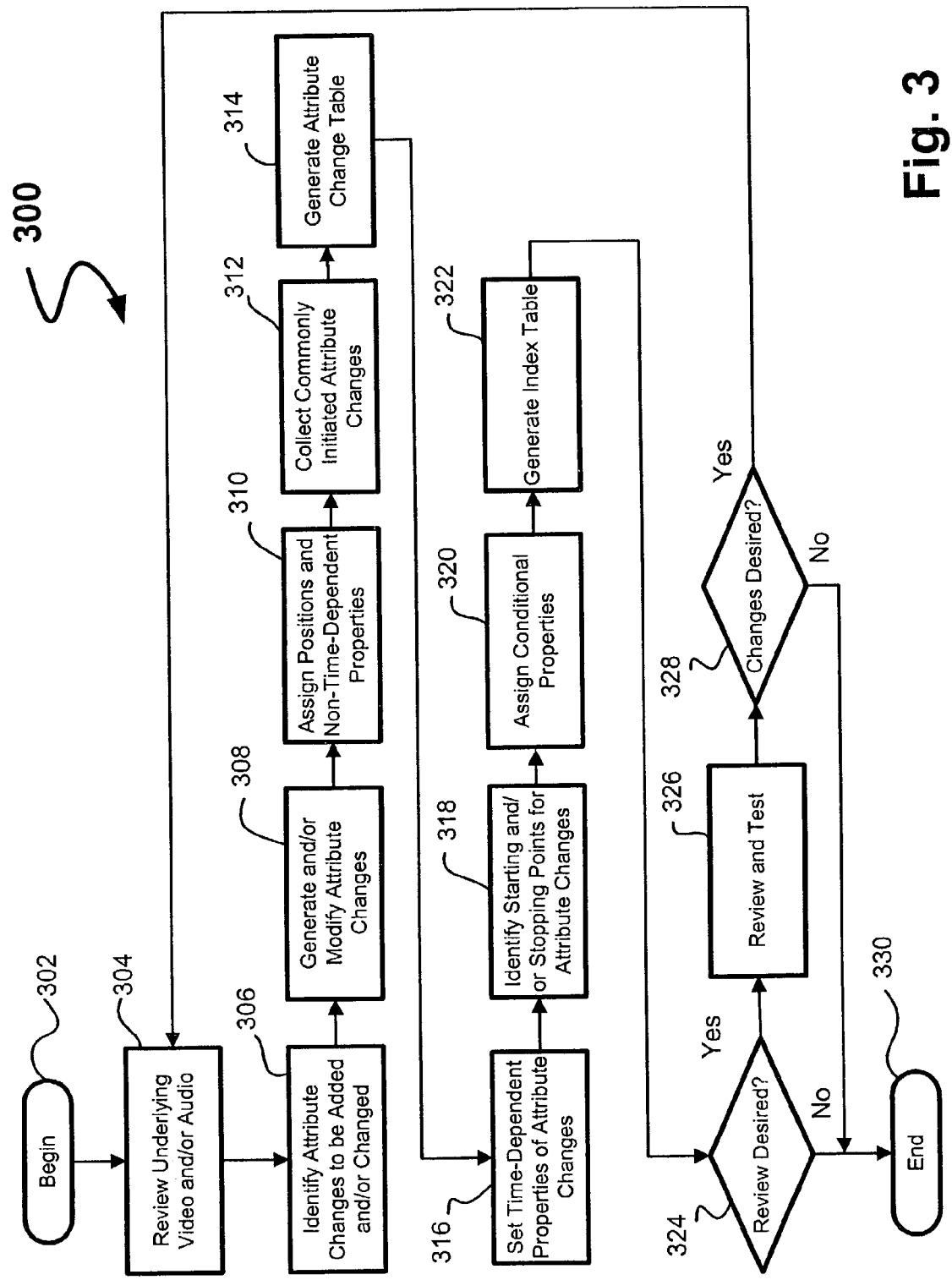
FIG. 3 is a flowchart for developing attribute changes according to an embodiment of the present invention.

FIG. 2B is a set of windows of the development environment shown in FIG. 2A for developing attribute changes. In particular, the icon and menu structure 202, the program monitoring window 204, the layout window 205, and the project window 206 are shown enlarged over their presentation in FIG. 2A. In the program monitoring window 204, facilities for creating and revising attributes or objects 220 are shown. Among the facilities shown are gridlines 222 for positioning objects. An application icon 224 is situated on the screen to signal to a viewer that the object on the screen marked by the application icon 224 is of interest to him or her. An application icon 224 can be used, for example, to signal a viewer interaction opportunity, such as the user having a chance to purchase the item marked with the application icon 224 through the use of his or her keyboard or remote control. Window specific icons-driven commands 226 are arranged to allow the user to manipulate the attributes. Such commands 226 might include one for enlarging a portion of displayed information, moving an overlapping attribute between a foreground and a background position, and other similar commands. The program monitoring window 204 also provides a view of the underlying program 228 for facilitating precision in placement, formatting, and consideration of attributes 220.

Along with the program monitoring window, the developer can incorporate items from the project menu. As shown in FIG. 2B, if an underlying program being viewed 228 in the program monitoring window, the developer may want to view or retrieve a recipe 227 from the project list to include in the present program. Also, using the layout window 205, the user may want to select specific attributes such as an attribute representing a video of merchandise for sale 229 that the program developer is tasked with promoting.

Once the attributes are created in terms of their positions and formats, the developer can develop how the attributes will be presented, including as desired correlating the attributes with the underlying program. FIG. 2C is a set of windows of the development environment developing index points for controlling attribute changes including the index point window 216. The operation of index points is described in detail in the concurrently filed co-pending application "METHOD AND SYSTEM FOR FLEXIBLE TIME-BASED CONTROL OF APPEARANCE AND BEHAVIOR OF SOFTWARE APPLICATION," bearing Ser. No. 10/427,343.

As can be seen in FIG. 2C, the index points window 216 is visually presented in timeline form allowing for graphical manipulation of points at which attributes will be introduced and/or changed. An index tables window 230 represents sets of attributes, such as "RecipeSegments" 232 and "InfoSegments" 234 which may be presented as part of the program. Within these sets of attributes, individual attributes can be set to modify the appearance of these attributes at specific times. For example, in the RecipeSegments set 232, index points relating to attributes concerning ingredients 236, such as asparagus and eggs, can be set. Similarly, in the InfoSegments set 234, index points relating to other content 238 such as "Oven" and "TableStools" can be set. As will be appreciated, different sets of attributes 232 and 234 might use different types of index points having characteristics which control whether attributes are presented depending on whether computer system execution commenced before events associated with the index point are reached (as explained in the patent application bearing Ser. No. 10/427,343 previously incorporated by reference). In any case, as can be seen in FIG. 2C, attributes 236 related to the RecipeSegments 232 have a single-ended index point 237 while the attributes 238 related to the InfoSegments have a range-specified index point 239. It will be appreciated that embodiments of the present invention both allow flexibility to choose different index points 237 and 239, and to allow a user to engage them through a graphical user interface.

In addition, the index points window 216 provides other features for supporting a program designer in associating attributes changes with events taking place during program execution through the use of index points. Event monitoring windows 240 and 241 allow the developer to monitor at what specific point in the program he or she is working in associating events with index points. The developer can use a first monitoring window 240 to monitor a frame number or a second monitoring window 241 to monitor program elapsed time, or the program developer can reference both windows 240 and 241. Tools also are provided to allow the developer to control a flow of the program to monitor the underlying program and set index points. For example, a play/pause control 242 allows the developer to control sequencing of the program in a way familiar to users of VCRs and DVD players. Segment controls 244 allow the developer to move back and forth between identified segments, as well as to associate index points with chosen events along the timelines represented in the index points window 216. In sum, the index points window 216 and its associated displays and tools allow the program developer to identify events for triggering attribute changes and associating them with index points.

FIG. 2D is a set of windows of the development environment shown in FIG. 2A for developing an attribute change table interacting with the set of index points. As the attributes 220 (FIG. 2B) were created and index points were associated with events taking place during the program (FIG. 2C), the state table window 214 allows the developer to collect attribute changes 254 into states which can be associated with the index points generated through the index points window 216 (FIG. 2C). The object property window 212 lists properties about attributes to be presented to the user. Sets of properties 250 relating to the attributes are collected into state changes represented in a column associated as a state change. Attribute changes can be made collectively over the course of successive state changes 251. For example, the attribute change for "txtInfoLabel" 254 is assigned different values for different state changes 251. Multiple attribute changes keyed by common events 258 are collected in state changes 251 represented as columns such that reaching an event associated by an index point with the state changes results in automatic initiation of the attribute changes so grouped. The state changes 251 can be associated with index points in the index points window 216 to control timing of the attribute changes keyed by common events 258 collected in a state table. Again, the operation of state changes grouped into such tables and their triggering using index points is described in more detail in the example described in connection with FIG. 1, as well as in the concurrently filed copending applications bearing Ser. Nos. 10/427,735 and 10/427,343 previously incorporated by reference.

Figure 2E:
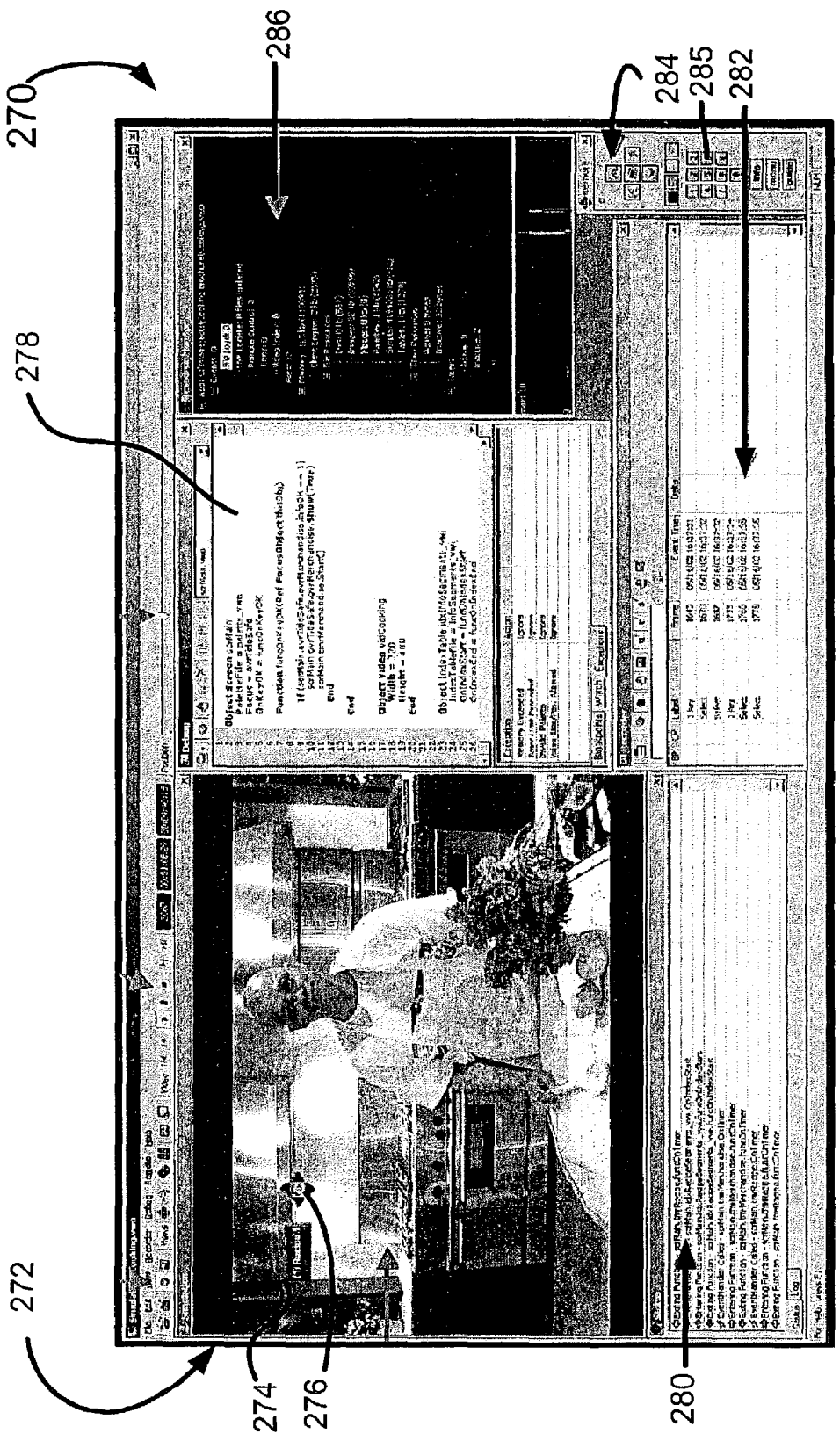
FIG. 2E is a set of windows for reviewing and revising attribute changes and index points.

FIG. 2E shows a monitoring environment 270 in which the result of attribute changes generated and keyed to index points can be reviewed. The monitoring environment includes a viewing window 272 for showing the program including attribute changes 274 generated. An application icon 224 is situated on the screen to signal to a viewer that the object on the screen marked by the application icon 224 is of interest to him or her. An application window allows 278 allows for text- and command-drive manipulation of code associated with the attribute changes, if the developer desires to make changes beyond or in addition to those that can be made through manipulation of the tables. A status window 280 textually presents a list of functions being executed to present the attribute changes shown so that the developer can monitor what is causing the attributes shown on the screen.

For testing interactive programs, a recording window 282 and a remote window 284 are provided. The developer can simulate how a viewer or user of an interactive program might interact with a STB or other device to engage the program. For example, if a program such as a cooking show offers opportunities to purchase merchandise, the developer can click on a screen button 285 to simulate a user making a choice on a keypad. As a result, this allows the developer to determine how well interactive attribute changes he or she created will function. Similarly, the recording window 282 records actions of the simulated user to allow the interactive program to be played back to review how well the interactive functionality operated. A resource monitoring window 286 also allows the developer to monitor system resource usage, such as memory usage, to determine whether the program meets practical constraints and objectives.

FIG. 3 is a flowchart showing a routine 300 for developing attribute changes according to an embodiment of the present invention. At a block 302, the routine begins and continues at a block 304 with reviewing any underlying video and/or audio program. At a block 306, attribute changes to be made or modified are identified. At a block 308, the attribute changes are generated or modified as desired. At a block 310, the attribute changes are assigned positions, colors, sizes, font types, and other attributes configurable in the development environment (FIGS. 2A-2E). At a block 312, attribute changes having common triggering events are grouped together, as commonly initiated attribute changes were grouped into state changes as described in connection with FIG. 2C. From these collected attribute changes, at a block 314 an attribute change table is generated for controlling some or all of the attributes connected with the program.

At a block 316, time dependency of collected attribute changes are selected as described in connection with FIGS. 2C and 2D. The user determines when the collected attribute changes are to begin, when their properties are to change, when their properties are to end, and, possibly, whether the attribute changes should be initiated if the event associated with the attribute changes was reached before computer system execution commenced. Further details concerning these time-dependencies are described in the concurrently filed co-pending patent application bearing Ser. No. 10/427,343 incorporated by reference. At a block 318, starting points or stopping points for attribute changes are set. At a block 320, conditional properties of the attribute changes are set. These conditional properties include whether the associated attribute changes are displayed if an event associated with the index point triggering the attribute change has passed before program execution has commenced, as further described in the concurrently filed co-pending application "METHOD AND SYSTEM FOR FLEXIBLE TIME-BASED CONTROL OF APPEARANCE AND BEHAVIOR OF SOFTWARE APPLICATION," bearing Ser. No. 10/427,343. At a block 322, an index table collecting the index point information is generated to work with the attribute change table generated at the block 314. In one presently preferred embodiment, these tables suitably are stored, revised, and transmitted separately to allow flexibility in modifying applications while reducing computer and/or transmission bandwidth overhead.

At a decision block 324, it is determined if review of the attribute changes is desired. If so, attribute changes are reviewed and tested at a block 326 as previously described in connection with FIG. 2E. If it is determined at a decision block 328 that changes are desired, the routine loops to the block 304 to begin reviewing content of the program and changing the attributes as desired. However, if it is determined at the decision block 324 that no further review is needed or it is determined at the decision block 328 that no changes are needed, the routine ends at a block 330.

Figure 4:
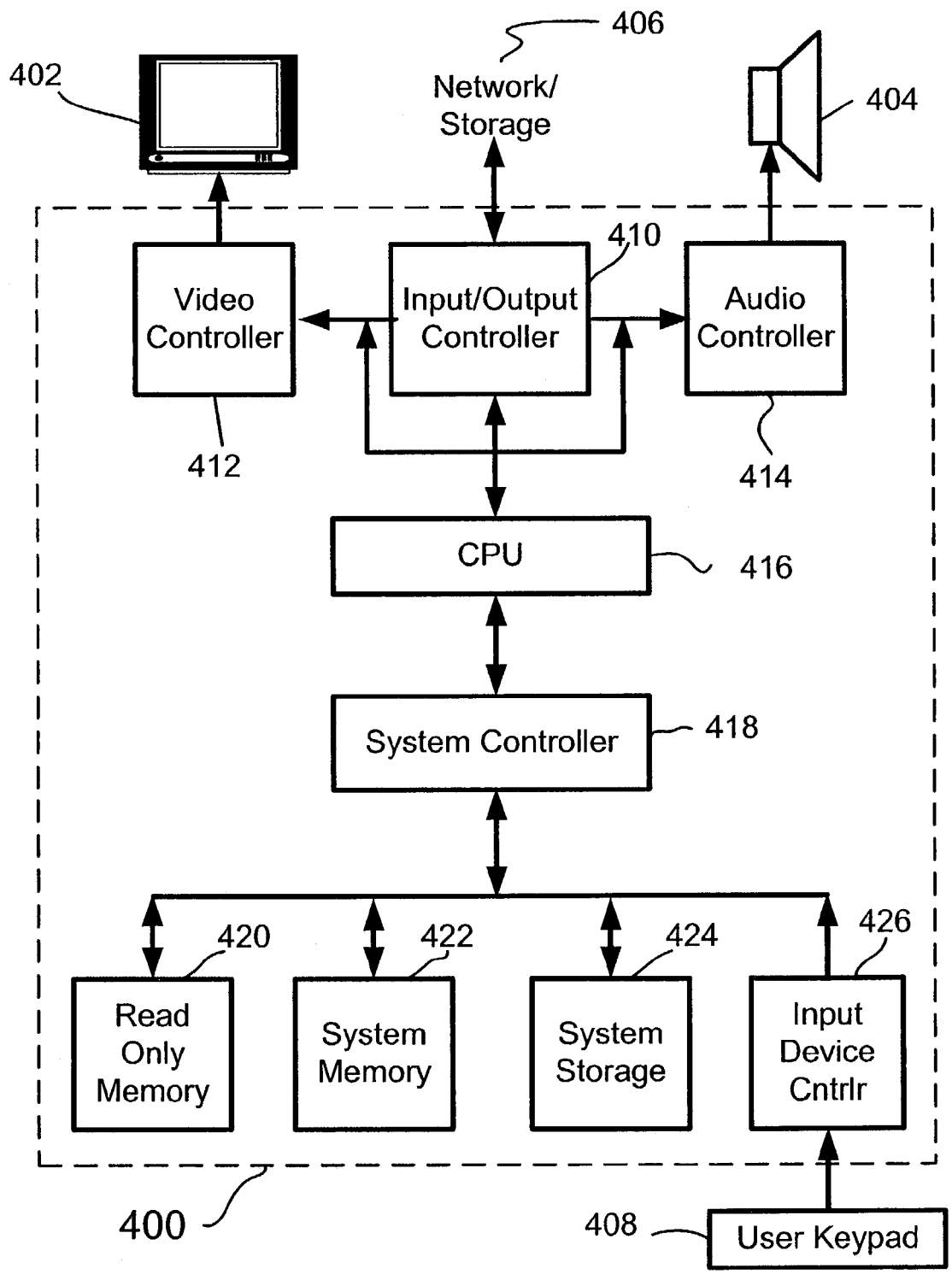
FIG. 4 is a block diagram of a data processing/media control system for generating applications and attribute changes according to an embodiment of the present invention.

FIG. 4 is a block diagram of a data processing/media control system for generating applications and attribute changes according to an embodiment of the present invention. Specifically, FIG. 4 shows a computer system 400 operable for using embodiments of the present invention. The computer system 400 is operable for controlling a display 402, such as a computer monitor or television, and an audio subsystem 404, such as a stereo or a loudspeaker system. The computer system 400 receives input from a network or storage 406. The network suitably is a computer network coupled with broadcast facilities for the transmission of programs created and modified using the system 400. The computer system 400 also receives user input from a wired or wireless user keypad 408, which may be in the nature of a computer keyboard or another input device.

The computer system 400 receives input via an input/output controller 410, which directs signals to and from a video controller 412, an audio controller 414, and a central processing unit (CPU) 416. In turn, the CPU 416 communicates through a system controller 418 with input and storage devices such as read only memory (ROM) 420, system memory 422, system storage 424, and input device controller 426.

The computer system 400 shown in FIG. 4 thus can revise and process attribute changes collected in attribute change tables and index points collected in index tables and pass them through the input/output controller 410 to the CPU 416 where they will be processed through the system controller 418, suitably in response to user input gathered through the user keypad 408 and the input device controller 426. The state changes collected in the table can then be executed and/or modified as triggered by the index points in the index table as previously described in connection with the foregoing example, method flowcharts, block diagrams, and co-pending patent applications incorporated by reference. User input or emulated user input can be returned by the input device controller 426 through the system controller 418 to the CPU 416 for processing. In turn, the CPU 416 transmits the information through the input/output controller 410 to the network for broadcast or other tranmission or to storage 406 as appropriate. Advantageously, changes can be made using this system 400 for immediate broadcast via the network 406.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for providing an authoring environment for generating an attribute change correlating with an underlying program to be executed by a computer system, the method comprising:
   providing a program monitor configured to monitor an underlying program;
   providing a timeline configured to represent execution of the underlying program;
   providing an attribute editor configured to allow one of creation, modification, and deletion of an attribute change;
   providing an index editor configured to allow one of creation, association, modification, and deletion of an index point correlating the attribute change with an event taking place during execution of the underlying program;
   providing an attribute monitor configured to observe execution by the computer system of the underlying program and the attribute change correlated with the underlying program; and
   providing an attribute generator configured to store the attribute change and the index point such that a computer system configured to execute the underlying program and the attribute change initiate the attribute change upon the index point being reached during execution of the computer system.

2. The method of claim 1, wherein the authoring environment is configured with a graphical user interface.

3. The method of claim 1, wherein the attribute editor is further configured to display at least one of a position attribute, a content attribute, and an appearance element of the attribute change.

4. The method of claim 1, wherein the attribute editor is further configured to display the index point with which the attribute has been associated.

5. The method of claim 4, wherein the attribute editor is further configured to display a state table colleting a plurality of attribute changes.

6. The method of claim 5, wherein the attribute editor is configured to group a plurality of attribute changes triggered by a common index point into a common state change.

7. The method of claim 5, wherein the state table lists the attribute changes along a first dimension of the state table and state changes along a second dimension of the state table such that as each current state change is reached, each attribute change associated with the current state change is triggered.

8. The method of claim 1, wherein the index editor is further configured to display at least one of an index property and the event with which the index point is associated.

9. The method of claim 8, wherein the index property includes a timing characteristic indicating whether the attribute change associated with the index point will be initiated if the execution of the computer system commenced after event associated with the index point has been reached.

10. The method of claim 4, wherein the attribute editor is further configured to display an index table collecting a plurality of index points.

11. The method of claim 10, wherein the index table includes a first column listing the index point and a second column listing the associated attribute change.

12. The method of claim 1, including transmitting data including at least one of the index point and the attribute change to remote locations such that a remote computer system can initiate the attribute change contemporaneously with receiving the data.

13. A computer readable medium for providing an authoring environment for generating an attribute change correlating with an underlying program to be executed by a computer system, the computer readable medium comprising:
   first computer program code means for providing a program monitor configured to monitor an underlying program;
   second computer program code means for providing a timeline configured to represent execution of the underlying program;
   third computer program code means for providing an attribute editor configured to allow one of creation, modification, and deletion of an attribute change;
   fourth computer program code means for providing an index editor configured to allow one of creation, association, modification, and deletion of an index point correlating the attribute change with an event taking place during execution of the underlying program;
   fifth computer program code means for providing an attribute monitor configured to observe execution by the computer system of the underlying program and the attribute change correlated with the underlying program; and
   sixth computer program code means for providing an attribute generator configured to store the attribute change and the index point such that a computer system configured to execute the underlying program and the attribute change initiate the attribute change upon the index point being reached during execution of the computer system.

14. The computer readable medium of claim 13, including seventh computer program code means for providing the authoring environment is configured with a graphical user interface.

15. The computer readable medium of claim 13, wherein the third computer program code means is further configured to display at least one of a position attribute, a content attribute, and an appearance element of the attribute change.

16. The computer readable medium of claim 13, wherein the third computer program codes means is further configured to display the index point with which the attribute has been associated.

17. The computer readable medium of claim 16, wherein the third computer program code means is further configured to display a state table colleting a plurality of attribute changes.

18. The computer readable medium of claim 17, wherein the third computer program code means is configured to group a plurality of attribute changes triggered by a common index point into a common state change.

19. The computer readable medium of claim 17, wherein the state table lists the attribute changes along a first dimension of the state table and state changes along a second dimension of the state table such that as each current state change is reached, each attribute change associated with the current state change is triggered.

20. The computer readable medium of claim 13 wherein the fourth computer program code means is further configured to display at least one of an index property and the event with which the index point is associated.

21. The computer readable medium of claim 20, wherein the index property includes a timing characteristic indicating whether the attribute change associated with the index point will be initiated if the execution of the computer system commenced after event associated with the index point has been reached.

22. The computer readable medium of claim 16, wherein the fourth computer program code means is further configured to display an index table collecting a plurality of index points.

23. The computer readable medium of claim 22, wherein the index table includes a first column listing the index point and a second column listing the associated attribute change.

24. The computer readable medium of claim 13, including fifth computer program code means for transmitting data including at least one of the index point and the attribute change to remote locations such that a remote computer system can initiate the attribute change contemporaneously with receiving the data.

25. A system for providing an authoring environment for generating an attribute change correlating with an underlying program to be executed by a computer system, the system comprising:
a user interface comprising:
a first component configured to provide a program monitor configured to monitor an underlying program;
a second component configured to provide a timeline configured to represent execution of the underlying program;
a third component configured to provide an attribute editor configured to allow one of creation, modification, and deletion of an attribute change;
a fourth component configured to provide an index editor configured to allow one of creation, association, modification, and deletion of an index point correlating the attribute change with an event taking place during execution of the underlying program;
a fifth component configured to provide an attribute monitor configured to observe execution by the computer system of the underlying program and the attribute change correlated with the underlying program; and
a processor configured to provide an attribute generator configured to store the attribute change and the index point such that a computer system configured to execute the underlying program and the attribute change initiate the attribute change upon the index point being reached during execution of the computer system.

26. The system of claim 25, wherein the authoring environment is configured with a graphical user interface.

27. The system of claim 25, wherein the attribute editor is further configured to display at least one of a position attribute, a content attribute, and an appearance element of the attribute change.

28. The system of claim 25, wherein the attribute editor is further configured to display the index point with which the attribute has been associated.

29. The system of claim 25, wherein the attribute editor is further configured to display a state table colleting a plurality of attribute changes.

30. The system of claim 29, wherein the attribute editor is configured to group a plurality of attribute changes triggered by a common index point into a common state change.

31. The system of claim 25, wherein the state table lists the attribute changes along a first dimension of the state table and state changes along a second dimension of the state table such that as each current state change is reached, each attribute change associated with the current state change is triggered.

32. The system of claim 25, wherein the index editor is further configured to display at least one of an index property and the event with which the index point is associated.

33. The system of claim 32, wherein the index property includes a timing characteristic indicating whether the attribute change associated with the index point will be initiated if the execution of the computer system commenced after event associated with the index point has been reached.

34. The system of claim 25, wherein the attribute editor is further configured to display an index table collecting a plurality of index points.

35. The system of claim 34, wherein the index table includes a first column listing the index point and a second column listing the associated attribute change.

36. The system of claim 25, including a sixth component configured to transmit data including at least one of the index point and the attribute change to remote locations such that a remote computer system can initiate the attribute change contemporaneously with receiving the data.

* * * * *